United States Patent [19]

Wang et al.

[11] Patent Number: 5,399,267

[45] Date of Patent: * Mar. 21, 1995

[54] LIQUID TREATMENT SYSTEM WITH AIR EMISSION CONTROL

[75] Inventors: Lawrence K. Wang, Latham, N.Y.; Lubomyr Kurylko, North Port, Fla.

[73] Assignee: International Environmental Systems, Inc., USA, Latham, N.Y.

[ * ] Notice: The portion of the term of this patent subsequent to Jun. 16, 2009 has been disclaimed.

[21] Appl. No.: 29,697

[22] Filed: Mar. 11, 1993

Related U.S. Application Data

[63] Continuation-in-part of Ser. No. 714,381, Jun. 11, 1991, and a continuation-in-part of Ser. No. 550,515, Jul. 10, 1990.

[51] Int. Cl.$^6$ .......................... C02F 3/30; B01D 53/04
[52] U.S. Cl. ..................................... 210/604; 210/605; 210/626; 210/630; 210/631; 96/10; 96/204
[58] Field of Search ............... 210/603, 604, 614, 605, 210/620–627, 629–631, 908, 909, 615–618; 96/10, 12, 14, 15, 117, 141, 704, 900–903

[56] References Cited

U.S. PATENT DOCUMENTS

| | | | |
|---|---|---|---|
| 3,724,667 | 4/1973 | McKinney | 210/604 |
| 3,909,409 | 9/1975 | Lange et al. | 210/604 |
| 3,946,534 | 3/1976 | Egly | 55/38 X |
| 4,029,574 | 6/1977 | Reimann | 210/604 |
| 4,080,287 | 3/1978 | Conway et al. | 210/604 |
| 4,323,372 | 4/1982 | Bentz et al. | 55/68 X |
| 4,407,717 | 10/1983 | Teletzke et al. | 210/631 |
| 4,623,464 | 11/1986 | Ying et al. | 210/631 X |
| 4,689,054 | 8/1987 | Vara et al. | 55/74 X |
| 4,715,965 | 12/1987 | Sigerson et al. | 55/74 X |
| 4,752,306 | 5/1988 | Henriksen | 55/38 |
| 4,810,386 | 3/1989 | Copa et al. | 210/631 |
| 4,820,318 | 4/1989 | Chang et al. | 55/68 |
| 4,846,852 | 7/1989 | Schweitzer et al. | 55/74 X |
| 4,857,198 | 8/1989 | Meidl | 210/631 |
| 4,859,216 | 8/1989 | Fritsch | 55/74 X |
| 4,892,664 | 1/1990 | Miller | 55/53 X |
| 4,937,004 | 6/1990 | Mandrin et al. | 55/53 X |
| 4,952,316 | 8/1990 | Cooley | 210/631 |
| 4,956,093 | 9/1990 | Pirbazari et al. | 210/631 |
| 4,966,611 | 10/1990 | Schumacher et al. | 55/74 X |
| 5,049,320 | 9/1991 | Wang et al. | 261/122 |
| 5,122,165 | 6/1992 | Wang et al. | 55/38 |
| 5,122,166 | 6/1992 | Hyrcyk et al. | 55/38 |
| 5,167,806 | 12/1992 | Wang et al. | 210/188 |

FOREIGN PATENT DOCUMENTS 2127711  4/1984  United Kingdom ............ 55/47

OTHER PUBLICATIONS

O'Brien, R. P. and J. L. Fisher. "There is an Answer to Groundwater Contamination." Water/Engineering & Management, May 1983.

O'Brien, R. P. and M. H. Stenzel. "Combining Granular Activated Carbon and Air Stripping." Public Works, Dec., 1984.

Stenzel, M. H. and U. S. Gupta. "Treatment of Contaminated Groundwaters with Granular Activated Carbon and Air Stripping." Journal of the Air Pollution Control Assoc., Dec., 1985.

*Primary Examiner*—Thomas Wyse

[57] ABSTRACT

The present invention relates to an air emission control system for removing volatile organic compounds (VOCs) and other objectionable contaminants from an emitted gas stream which is generated from a water treatment means. Specifically the improved air emission control system of this invention relates to collecting, dehumidifying, bypassing, diluting, monitoring, purifying recycling and reusing the emitted gas stream, and also relates to feeding an inert gas, upon demand, for reducing oxygen content of said emitted gas stream, in turn, for preventing a gas purification contactor from being ignited and/or exploded due to oxidation of carbonaceous substances inside said gas purification contactor. A complete water treatment and gas emission control system is developed by applying the air emission control system to either single stage water treatment or multiple stage water treatment. The present invention which causes no air pollution is a low cost and highly efficient alternative to present site remediation and water treatment technologies.

13 Claims, 3 Drawing Sheets

LIQUID TREATMENT SYSTEM WITH AIR EMISSION CONTROL

This is a continuation-in-part of two U.S. patent application Ser. Nos. 07/714,381, filed Jun. 11, 1991, now pending and being a continuation-in-part of Ser. No. 07/550,515, filed Jul. 10, 1990, now pending

BACKGROUND OF THE INVENTION

1. Field of the Invention

The present invention relates to an air emission control system for removing volatile organic compounds (VOCs) and other objectionable contaminants from an emitted gas stream which is generated from a water treatment means. Specifically the improved air emission control system of this invention relates to collecting, dehumidifying, bypassing, diluting, monitoring, purifying recycling and reusing the emitted gas stream, and also relates to feeding an inert gas, upon demand, for reducing oxygen content of said emitted gas stream, in turn, for preventing a gas purification contactor from being ignited and/or exploded due to oxidation of carbonaceous substances inside said gas purification contactor. A complete water treatment and gas emission control system is developed by applying the air emission control system to either single stage water treatment or multiple stage water treatment. The present invention which causes no air pollution is a low cost and highly efficient alternative to present site remediation and water treatment technologies.

About 70 percent of potable water in the U.S.A. is supplied by groundwater.

Groundwater contamination, which is a national major concern, is about 71 percent caused by industrial accidents (chemical spills, tank leaks, etc.), 16 percent caused by railroad or truck's chemical accidents, and 13 percent caused by leachates from lagoons or dumpsites.

The primary reasons for treating groundwater are: potable use (39 percent), clean-up of aquifer to prevent spread of contamination (48 percent), and industrial and commercial use (13 percent). In any case, the potentially hazardous VOCs must be removed. Timely clean-up of aquifer to prevent spread of contamination is extremely important because the damage can be beyond repair if the spread of contamination is too wide.

Toxic organic compounds commonly found in groundwater include, but will not be limited to, the following: carbon tetrachloride, chloroform, dibromo chloro propane, DDD, DDE, DDT, CIS-1,2 dichloro ethylene, dichloro pentadiene, diisopropyl ether, tertiary methyl butyl ether, diisopropyl methyl phosphonate, 1,3-dichloro propene, dichloro ethyl ether, dichloro isopropyl ether, benzene, acetone, ethyl acrylate, trichloro trifloro ethane, methylene chloride, phenol, orthochloro phenol, tetrachloro ethylene, trichloro ethylene, 1,1-trichloro ethane, vinylidiene chloride, toluene, xylene, EDB and others.

Conventional water treatment means for groundwater purification is an air stripping tower in which a groundwater containing toxic volatile organic compounds is introduced to the top of said air stripping tower forming a swarm of downward water droplets, while a bulk volume of air is introduced to the bottom of said air stripping tower forming an upward counter current air stream. In other words, water droplets enter the air phase (gas phase) for removing volatile organic compounds from said water droplets by air stripping action. An emitted gas stream containing toxic volatile organic compounds and other volatile contaminants is formed, and exits from the top of said air stripping tower. This emitted gas stream must be properly treated in order to prevent air pollution. An air stripping tower water effluent containing negligible concentration of volatile organic compounds is also formed. Although the efficiency of an air stripping tower for removing volatile organic compounds from a contaminated groundwater is high, disposal of its emitted gas stream containing toxic volatile organic compounds generally is a problem.

Conventional water treatment means for treating wastewater is a biological activated sludge process plant in which an aeration basin having a mixed liquor and suspended microorganisms is used for removing organics from wastewater by biochemical reactions in the presence of air bubbles, microorganisms and nutrients. Due to physical action of air bubbling, an emitted gas stream containing odorous, toxic, volatile organic compounds is also generated over the top of said aeration basin. Air emission control at activated sludge process plants is now an important environmental engineering task.

Recently several dissolved air flotation plants and dispersed air flotation plants are developed. These modern water treatment meanses utilize flotation technology for either water purification or wastewater treatment. Since air bubbles must be generated for removing volatile, surface-active, oily and/or suspended contaminants from a water stream, an emitted gas stream containing these contaminants is also formed over the top of a flotation plant, in turn, causing air pollution.

The method and apparatus of this invention have been developed specifically for air pollution control at air stripping towers, activated sludge process plants, dissolved air flotation plants, dispersed air flotation plants and other similar plants that generate gas bubbles and/or emitted gas streams.

In addition to treating the contaminated ground water, commercial, industrial or municipal wastewaters containing VOCs and other toxic volatile contaminants can all be efficiently treated by the process system of the present invention.

2. Description of the Prior Art

Conventional technologies for groundwater treatment include: air stripping without air emission control, granular activated carbon, chemical oxidation, and biological processes. Air stripping without air emission control is not acceptable in many states.

Granular activated carbon contactor is technically feasible for either water purification or air emission control, but may be economically unfeasible when it is used alone. Lawrence K. Wang et al (U.S. Pat. No. 5,122,165, Jun. 16, 1992) and Orest Hrycyk et al (U.S. Pat. No. 5,122,166, Jun. 16, 1992) have developed two physical-chemical processes for groundwater treatment both processes using a liquid phase granular activated carbon contactor for water purification and using a gas phase granular activated carbon contactor for air emission control. A biological process for groundwater treatment with air emission control has also been developed by Lawrence K. Wang et al (U.S. patent application Ser. No. 550,515, filed Jul. 10, 1990, now pending).

The above three inventions (U.S. Pat. Nos. 5,122,165 and 5,122,166; and U.S. patent application Ser. No. 550,515, filed Jul. 10, 1990) relate to efficient and cost-effective groundwater purification systems aiming at clean-up of aquifer to prevent spread of VOCs contamination in the environment. The purified groundwater can be discharged to a recharging well; while the purified gas is recycled to the system for gas stripping, thus eliminating a gas emission problem. The above three inventions consider the affordability, performance, governmental acceptance, air pollution prevention and simplified operation.

The present invention, however, relates to an improved air emission control system that can be used in conjunction with the above three inventions (U.S. Pat. Nos. 5,122,165 and 5,122,166; and U.S. patent application Ser. No. 550,515, filed Jul. 10, 1990) as well as with other prior art systems described by O'Brien and Fisher (Water Engineering & Management, May 1983), O'Brien and Stenzel (Public Works, December 1984), Stenzel and Gupta (Journal of the Air Pollution Control Association, December 1985), Krofta (U.S. Pat. Nos. 2,874,842, 3,182,799, 4,022,696, 4,184,967, 4,377,485, 4,626,345, and 4,931,175), Ying et al (U.S. Pat. Nos. 4,623,464, and 4,755,296), Copa et al (U.S. Pat. No. 4,810,386), Meidl (U.S. Pat. No. 4,857,198), Irvine et al (U.S. Pat. No. 5,126,050) and Wang et al (U.S. Pat. No. 5,069,783).

The prior art air pollution control systems for removing volatile organic compounds from an emitted gas stream include gas incineration and gas phase granular activated carbon adsorption. Gas incineration is efficient but extremely expensive. Granular activated carbon adsorption is affordable, but frequently causes combustion at carbon beds or even explosion due to interactions of carbon, volatile organic compounds, and oxygen during a rising temperature at carbon beds.

Prior art concerning treatment of a gas effluent from multistep liquid treatment systems has been reviewed. Carnahan et al merely treat a gas effluent in a reactor tank with chlorine, in accordance with their U.S. Pat. No. 4,919,814. Irvine et al suggests such gas effluent being treated by carbon adsorption followed by membrane separation in accordance with their U.S. Pat. No. 5,126,050 (Col. 11, lines 36–41). U.S. Pat. No. 4,894,162, awarded to Cournoyer et al in January 1990, suggests such gas effluent being treated by venturi dilution and collection in a tank where microorganism action purifies the gas. Anderson's U.S. Pat. No. 4,391,704 suggests venturi dilution, treatment with chlorine or ozone and adsorption. Meidl's U.S Pat. No. 4,857,198 suggests initial separate gas stripping followed by recycling of such gas effluent back to the treatment system containing biological solids and powdered adsorbent. A publication by Waltrip et al (Journal WPCF, Vol. 57, No. 10, 1985) suggests primarily treatment of such gas effluent in a scrubber.

The method and apparatus of this invention, however, relates to an air emission control system comprising a gas piping system, at least one gas mover, at least one gas dilution unit, a demister, a monitoring unit, at least one gas bypass unit, a gas purification contactor, a recycling unit, at least one gas sampling unit, and an inert gas source for preventing possible combustion or explosion to be occurred inside the gas purification contactor. Said gas purification contactor of this invention is packed with virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, membrane filter media, or combinations thereof for removal of volatile contaminants from a gas effluent emitted from multistep liquid treatment systems.

SUMMARY OF THE INVENTION

In accordance with the present invention, an improved process method for removing volatile contaminants from an emitted gas stream comprises the following steps:

(a) providing an enclosure and a gas piping system to collect said emitted gas stream from a water treatment means, (b) operating at least one low pressure and low volume gas mover to move said emitted gas stream from said water treatment means through said enclosure and said gas piping system to a dehumidifying means comprising at least a demister pad for removing water droplets from said emitted gas stream, (c) monitoring the emitted gas stream with a flow meter, a vacuum/pressure gauge, and a humidity meter for measuring gas flow, vacuum/pressure, and humidity, respectively, (d) sampling the emitted gas stream which has been dehumidified at an inlet sampling port for determining gas quality of said emitted gas stream which has been dehumidified, (e) providing a first bypass means comprising a first bypass line, and a first gas dilution means for bypassing, diluting and discharging said emitted gas stream which has been dehumidified if air emission standards are met, (f) diluting oxygen concentration of said emitted gas stream which has been dehumidified with at least one inert gas from an inert gas source, thereby producing an inert gas diluted gas stream, which causes no ignition nor explosion inside a gas purification contactor at downstream, (g) treating said inert gas diluted gas stream with said gas purification contactor, thereby producing a contactor effluent, (h) sampling the contactor effluent at an outlet sampling port for determining gas quality of said contactor effluent, in turn, determining the efficiency of said gas purification contactor in removing volatile contaminants, (i) discharging said contactor effluent to an ambient air environment through a second bypass means comprising a second bypass line and a second gas dilution means, if gas quality of said contactor effluent meets said air emission standards, (j) recycling said contactor effluent to said water treatment means for treating water, in turn, generating additional emitted gas stream, and (k) providing a make-up gas to said water treatment means from a make-up gas source for treating water.

Still in accordance with the present invention, an air emission control apparatus for treating an emitted gas stream containing high concentrations of volatile contaminants comprises the following in combination:

(a) an enclosure and a gas piping system for collecting said emitted gas stream from a water treatment means, (b) a dehumidifying means comprising at least a demister pad directly or indirectly connected to said enclosure and said gas piping system for removing humidity from said emitted gas stream, (c) at least a gas mover directly or indirectly connected to said enclosure for moving said emitted gas stream, (d) a monitoring means directly or indirectly connected to said gas mover for monitoring said emitted gas stream, said monitoring means further comprising a flow meter, a vacuum/pressure gauge, and a humidity meter for measuring gas flow rate, vacuum/pressure and humidity, respectively, of said emitted gas stream, (e) an inlet sampling port directly or indirectly connected to said monitoring means and said gas mover for sampling and analyzing said emitted gas stream, (f) a first bypass means connected to said gas piping system and said inlet sampling port at upstream of a gas purification contactor for bypassing said emitted gas stream when gas quality of said emitted gas stream meets air emission standards; said first bypass means further comprising a first bypass line, and a first gas dilution means for diluting said emitted gas stream with air before being discharged into an ambient air environment, (g) an inert gas source connected to said gas piping system at upstream of said gas purification contactor for supplying at least one inert gas to said gas purification contactor, in turn for preventing ignition and explosion inside said gas purification contactor, (h) said gas purification contactor connected to said gas piping system and said inert gas source for purifying said emitted gas stream, thereby producing a contactor effluent; said gas purification contactor further comprising a purifying agent, (i) an outlet sampling port connected to said gas piping system at downstream of said gas purification contactor for sampling and analyzing said contactor effluent, (j) a second bypass means connected to said gas piping system and said gas purification contactor for discharging said contactor effluent when gas quality of said contactor effluent meets air emission standards; said second bypass means further comprising a second bypass line and a second gas dilution means for diluting said contactor effluent with air before being discharged into said ambient air environment, (k) a recycle pipe line connected to upstream of said water treatment means, but downstream of said second bypass line, said outlet sampling port and said gas purification contactor for recycling said contactor effluent to said water treatment means for reuse in treating water, in turn, producing additional emitted gas stream, and (l) a make-up gas source directly or indirectly connected to said water treatment means for supplying additional gas upon demand for treating water.

DESCRIPTION OF THE PREFERRED EMBODIMENTS

Figure 1:
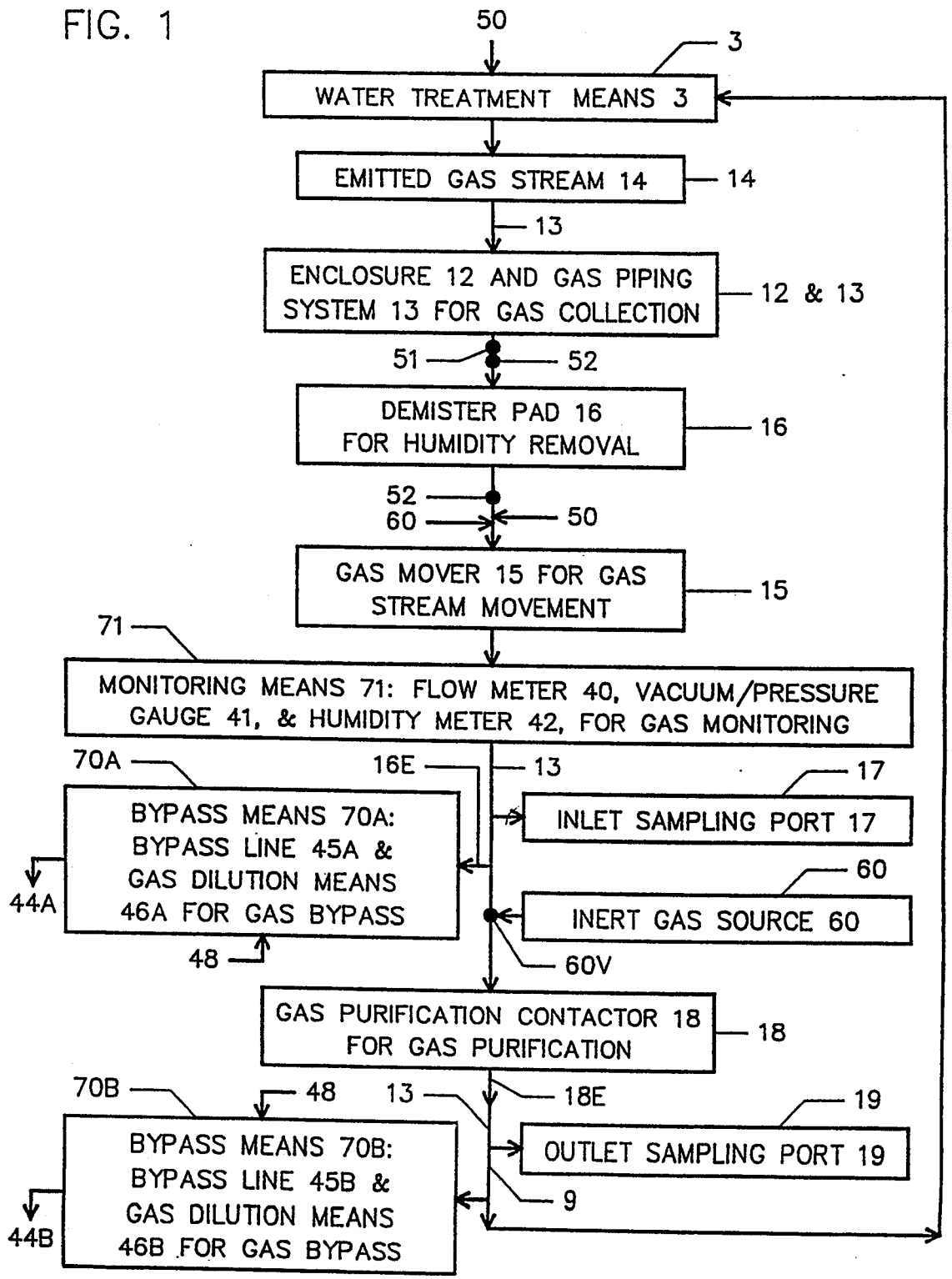
FIG. 1 is a flow diagram of the present invention when applied to water treatment.
Figure 2:
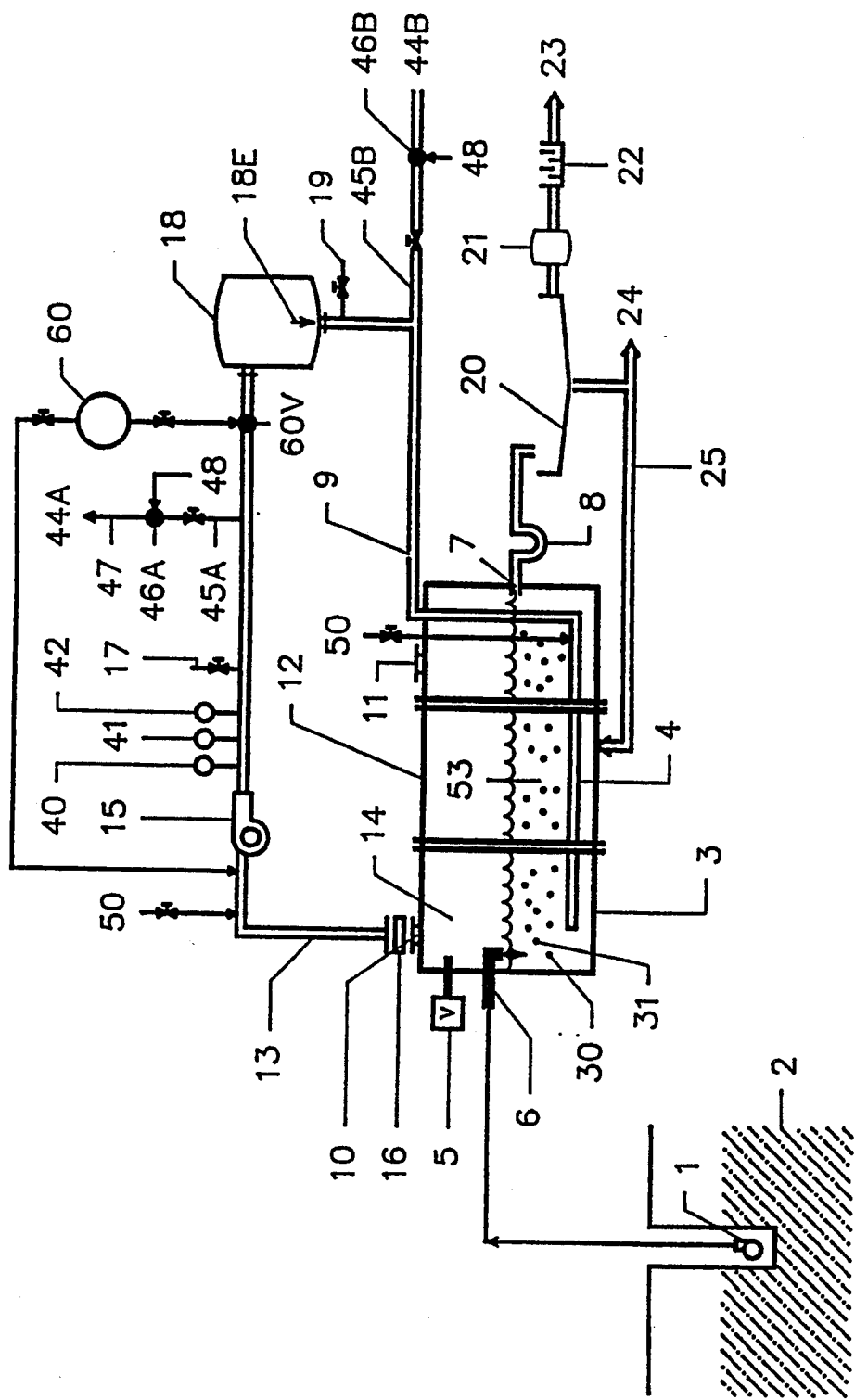
FIG. 2 is a schematic diagram of the present invention when a single stage system is applied to groundwater purification or wastewater treatment considering gas emission control.

In accordance with the present invention, an air emission control apparatus for treating an emitted gas stream containing high concentrations of volatile contaminants comprises the following in combination shown in FIGS. 1 and 2:

(a) an enclosure 12 and a gas piping system 13 for collecting said emitted gas stream 14 from a water treatment means 3, (b) a dehumidifying means comprising at least a demister pad 16 directly or indirectly connected to said enclosure 12 and said gas piping system 13 for removing humidity from said emitted gas stream 14, (c) at least a gas mover 15 directly or indirectly connected to said enclosure 12 for moving said emitted gas stream 14, (d) a monitoring means 71 (FIG. 1) directly or indirectly connected to said gas mover 15 for monitoring said emitted gas stream 14; said monitoring means 71 further comprising a flow meter 40, a vacuum/pressure gauge 41, and a humidity meter 42 for measuring gas flow rate, vacuum/pressure and humidity, respectively, of said emitted gas stream 14, (e) an inlet sampling port 17 directly or indirectly connected to said monitoring means 71 and said gas mover 15 for sampling and analyzing said emitted gas stream 14, (f) a first bypass means 45A directly or indirectly connected to said gas piping system 13 and said inlet sampling port 17 at upstream of a gas purification contactor 18 for bypassing said emitted gas stream 14 when gas quality of said emitted gas stream 14 meets air emission standards; said first bypass means 70A (shown in FIG. 1) further comprising a first bypass line 45A, and a first gas dilution means 46A for diluting said emitted gas stream 14 with air 44A, (g) an inert gas source 60 connected to said gas piping system 13 before being discharged into an ambient air environment stem 13 at upstream of said gas purification contactor 18 for supplying at least one inert gas to said gas purification contactor 18, in turn for preventing ignition and explosion inside said gas purification contactor 18, (h) said gas purification contactor 18 connected to said gas piping system 13 and said inert gas source 60 for purifying said emitted gas stream 14, thereby producing a contactor effluent 18E; said gas purification contactor 18 further comprising a purifying agent, (i) an outlet sampling port 19 connected to said gas piping system 13 at downstream of said gas purification contactor 18 for sampling and analyzing said contactor effluent 18E, (j) a second bypass means 70B (shown in FIG. 1) connected to said gas piping system 13 and said gas purification contactor 18 for discharging said contactor effluent 18E when gas quality of said contactor effluent 18E meets air emission standards; said second bypass means 70B further comprising a second bypass line 45B and a second gas dilution means 46B for diluting said contactor effluent 18E with air 48 before being discharged into said ambient air environment 44B, (k) a recycle pipe line 9 directly or indirectly connected to said water treatment means 3 and said second bypass line 45B, said outlet sampling port 19 and said gas purification contactor 18 for recycling said contactor effluent 18E to said water treatment means 3 for reuse in treating water, in turn, producing additional emitted gas stream 14, and (l) a make-up gas source 50 directly or indirectly connected to said water treatment means 3 for supplying additional gas upon demand for treating water 2.

A complete water treatment and gas emission control system shown in FIG. 2 is presented below as a typical example. An influent pump 1 feeds a contaminated water 2 to an enclosed water treatment means 3, which is seeded/fed with microorganisms 30 and/or chemical 31 and is equipped with a sparger system 4, a vacuum breaker 5, a water inlet 6, a water outlet 7 with trap 8, a gas inlet recycle pipe line 9 to said sparger system 4, a gas outlet 10 to a gas recycle system, a manhole with cover 11, and an enclosure 12.

The water treatment means 3 shown in FIG. 2 is constructed to provide sufficient gas head space for holding an emitted gas stream 14 above water 53 in said water treatment means 3. Gas bubbles generated from the sparger system 4 passing through water 53 inside said water treatment means 3 entrains volatile organic compounds (VOCs) and other volatile contaminants from water phase 53 into gas phase becoming an emitted gas stream 14. The remaining VOCs and other organic contaminants are removed by the microorganisms 30 and/or chemical 31 in the water phase 53 inside said water treatment means 3.

Said chemical 31 include inorganic chemical, organic chemical, powdered activated carbon, peat moss and enzymes. The microorganisms 30 include aerobic, facultative and enzymatic (enzyme producing) microorganisms which may be fed to said water treatment means 3 for aerobic biological treatment. Anaerobic and facultative microorganisms may be seeded to said water treatment means 3 for anaerobic biological treatment when entire liquid treatment and gas emission control system shown in FIG. 2 is full of inert gas(es) from an inert gas source 60.

The emitted gas stream 14 from said water treatment means 3, shown in FIGS. 1 and 2 containing VOCs is sucked by a gas mover 15, and passes through the gas outlet 10 and a dehumidifying means such as a demister pad 16 or equivalent to remove water droplets from said emitted gas stream 14. The preferred gas mover 15 shown in FIGS. 1 and 2 is of low pressure (5 to 15 psi) and low volume (500 to 1500 scfm) type.

The dehumidified gas from said demister pad 16 or an equivalent dehumidifying means is monitored by a monitoring means 71 comprising a flow meter 40, a vacuum/pressure gauge 41, and is sampled at an inlet sampling port 17. Said dehumidified gas from said demister pad 16 or said equivalent dehumidifying means can be either bypassed through a bypass line 45A, or purified by a gas purification contactor 18 specifically designed for gas emission control, thereby producing a contactor effluent 18E., as shown in FIGS. 1 and 2. The contactor effluent 18E is sampled at an outlet sampling port 19, and is either partially or totally bypassed through a second bypass line 45B, or recycled to the water treatment means 3 via the gas inlet recycle pipe 9 and the sparger system 4 for continuous water purification for a plurality of times, as shown in FIG. 2.

The heart of this invention is the inert gas source 60 (FIGS. 1 and 2) which supplies at least one inert gas upon demand to said gas purification contactor 18, in order to dilute oxygen concentration in said emitted gas stream 14.

In case said purifying agent in said gas purification contactor 18 is granular activated carbon or fibrous activated carbon, the temperature of said granular or fibrous activated carbon gradually increase due to adsorption of volatile organic compounds onto said granular or fibrous activated carbon. At an elevated temperature with sufficient oxygen content, the volatile organic compounds and said granular or fibrous activated carbon may be ignited causing explosion and equipment damage. The inert gas source 60 of this invention is the solution to this ignition and explosion problem. After the oxygen content in said emitted gas stream 14 is significantly diluted by said inert gas, ignition or explosion at said gas purification contactor 18 can then be avoided.

The inert gas source 60 of this invention is selected from the group comprising nitrogen, helium, carbon dioxide, or combination thereof, which are commercially available in liquid cylinder form.

Alternatively the inert gas source 60 can be either a pressure swing adsorption (PSA) system or a vacuum swing adsorption (VSA) system. The former (PSA) applies pressure, while the latter (VSA) applies vacuum for moving an air stream containing oxygen, nitrogen, carbon dioxide, etc. Pelletized adsorbents, call molecular sieves, show a preference, at a given temperature and pressure, for nitrogen, carbon dioxide and hydrocarbons in air. When operating a PSA system, the pelletized adsorbent is contained in multiple adsorption vessels through which the influent pressurized air flows. Nitrogen, carbon dioxide and trace amount of hydrocarbons are adsorbed by the pelletized adsorbent. The non adsorbed gas, oxygen, passes through until the pelletized adsorbent becomes saturated. The air flow is then switched to the next vessel and the pelletized adsorbent is regenerated by depressurization, releasing the trapped nitrogen and other trace gases. Each of the vessels is pressurized and depressurized sequentially to produce a continuous stream of inert nitrogen and a continuous steam of oxygen.

The oxygen produced from said PSA system is a byproduct which can also be used in said water treatment means 3 if aerobic biological treatment is intended; while the nitrogen produced from the same PSA system is to be used as the inert gas source 60 of this invention. The inert gas source 60 supplies inert gas for preventing said gas purification contactor 18 from being ignited or exploded, and also for operating said water treatment means 3 for anaerobic biological treatment, upon demand.

The monitoring means comprises a flow meter 40, a vacuum/pressure gauge 41 and a humidity meter 42 (or combinations thereof) for measuring gas flow rate, vacuum/pressure and humidity, respectively, of said emitted gas stream 14, as shown in FIG. 2.

The first bypass line 45A comprises a first gas dilution means 46A for diluting the emitted gas stream 16E (FIG. 1) with air 48, and discharging it 16E to an ambient air environment 44A, under the condition that governmental air emission standards can be met. If said air emission standards can not be met, said emitted gas stream 16E (FIG. 1) should not be bypassed, instead, should be forwarded to said gas purification contactor 18 for purification.

The second bypass line 45B comprises a second gas dilution means 46B for diluting the contactor effluent 18E with air 48, and discharging it 18E with air 48, and discharging it 18E to the ambient air environment 44B, under the condition that governmental air emission standards can be met. Said outlet sampling port 19 is for gas quality control and assurance. Said second bypass line 45B is required if recirculation of the contactor effluent 18E to the water treatment means 3 through said recycle pipe line 9 is not intended or interrupted.

A make-up gas source 50 connected to said water treatment means 3 is for supplying additional gas upon demand. As a typical example, a make-up gas source 50 can be either air or oxygen if said water treatment means 3 is an aerobic biological treatment plant in which microorganisms require oxygen for their biochemical reactions.

In case that said water treatment means 3 is an air stripping unit, a dissolved gas flotation plant, a dispersed gas flotation plant, a foam separation plant, a froth flotation plant, a non-biological reactor, an anaerobic biological plant, or a physical-chemical plant, each involving generation of gas bubbles and an emitted gas stream, entire water treatment means 3 and entire gas emission control apparatus shown in FIG. 1 can be filled with one or more inert gases. The bubbles in said water treatment means 3 are inert gas bubbles, such as nitrogen, helium, carbon dioxide, or combinations of. The emitted gas stream 14 as well as the contactor effluent 18E contain mainly inert gas. Besides, the contactor effluent 18E is continuously recycled to said water treatment means 3 for generation of more inert gas bubbles. Under this process condition, both said first bypass line 45A and said second bypass line 45B can be idled or disconnected. Only small volume of inert gas is required to be the make-up gas source 50.

The purified water 53 in said water treatment means 3 shown in FIG. 2 flows through the water outlet 7 and a trap 8 and is further treated by a clarifier 20, a filter 21 and a disinfection unit 22. The plant effluent 23 is further treated or discharged to the environment. The sludge from said clarifier 20 is either partially recycled via a sludge recycle line 25 to the water treatment means 3, or partially/totally discharged as waste sludges 24.

Entire said water treatment means 3 and its gas emission control system (FIG. 1) comprising said enclosure 12, gas piping system 13, dehumidifying means such as demister pad 16, gas mover 15, gas purification contactor 18, inlet sampling port 17, outlet sampling port 19, bypass means 70A and 70B (FIG. 1), and monitoring means 71, sampling ports 17 and 19, inert gas source 60 and recycle line 9 are completely enclosed, thus eliminating gas emissions or secondary air pollution.

The present invention is specific for removal of volatile contaminants including volatile organic compounds (VOCs). VOCs are removed by gas purification contactor 18 in the gas phase rather than water phase. The remaining organic compounds are removed by the microorganisms 30 and/or chemical 31 in said water treatment means 3. Removal of VOCs by conventional granular activated carbon (GAC) filter in water phase is hindered by the other organic and inorganic compounds competing for adsorption sites on the GAC. Consequently, more VOCs are removed by the present invention's gas purification contactor 18 in the gas phase than that removed by conventional GAC filter in the water phase. The gas purification contactor 18 of this invention contains a purifying agent; while the filter means 21 of this invention contains a filter media. Both said purifying agent and said filter media are selected from a group comprising granular activated carbon, polymeric adsorbent, activated alumina, ion exchange resin, manganese dioxide, magnesium oxide, fibrous activated carbon, membrane filter media, fiberglass filter media, coalescing filter media, or combinations thereof. All filter media to be adopted by this invention are insoluble, and further comprise sand, coal, diatomaceous earth, calcium carbonate, or combinations thereof. Said purifying agent further comprise calcium chloride, sodium carbonate, lime, potassium carbonate, or combinations thereof, for further removing humidity and/or adjusting pH inside said gas purification contactor 18.

The size of said water treatment means 3 shown in FIG. 2 is altered to adjust the hydraulic residence time to conform to different influent flow rates.

In normal operation, the water treatment means 3 shown in FIG. 2 is under slightly negative pressure and is provided sufficient gas head space above the level of water 53 in said water treatment means 3.

The sparger system 4 is located at bottom of said water treatment means 3, shown in FIG. 2. The low pressure and low volume gas mover 15 provides energy for gas recirculation and gas bubbling through water phase containing influent water 2, chemical 31 and/or microorganisms 30. The gas bubbles passing through said water phase 13 and entraining (VOCs) from water phase 53 into gas phase becoming said emitted gas stream 14 inside said water treatment means 3, shown in FIG. 2 is a physical reaction, termed gas stripping. The remaining VOCs and other organic contaminants in said water phase 53 are removed by biochemical reactions of microorganisms 30 and/or by physical chemical reactions of chemical 31.

The emitted gas stream 14 containing VOCs exits said water treatment means 3 (See FIG. 2) and passes through a dehumidifying means such as a demister pad 16 to remove water droplets before entering said gas purification contactor 18 for adsorbing VOCs onto said purifying agent from said emitted gas stream 14 in high efficiency.

The trap 8 of said water outlet 7 prevents external air intrusion into said water treatment means 3, shown in FIG. 2. Partial recycling of the sludge produced from said clarifier 20 is for maintaining a constant population of microorganisms 30 in said water treatment means 3 under the condition that the water treatment means is operated for either aerobic biological treatment, or anaerobic biological treatment, in the presence of appropriate microorganisms and dissolved gases in water phase 53. The partially discharged waste sludges 24 include excess microorganisms and/or spent chemical flocs.

The inlet sampling port 17 and the outlet sampling port 19 at upstream and downstream, respectively, of the gas purification contactor 18 determine the present invention's efficiency for VOCs reduction.

When the purifying agent in said gas purification contactor 18 is exhausted, the spent purifying agent is replaced with virgin purifying agent, chemically treated purifying agent, and/or regenerated purifying agent.

The microorganisms 30 inside said water treatment means 3 are mixed with the chemical 31, upon demand, for improvement of water or wastewater treatment efficiency. Alternatively said chemical 31 can be fed to said water treatment means 3 without said microorganisms 30

The present invention is applied to groundwater decontamination as well as treatment of industrial, commercial or municipal wastewater, in which the water treatment means 3 generates said emitted gas stream 14.

The gas emission control apparatus (comprising all process units shown in FIG. 1 excluding said water treatment means 3) of the present invention is easily adjusted for treating said emitted gas stream 14 from various water treatment means 3 including conventional air stripping towers similar to that were described in the literature (R. P. O'Brien and J. L. Fisher, Water-/Engineering & Management, May 1983; R. P. O'Brien and M. H. Stenzel, Public Works, December 1984; M. H. Stenzel and U. S. Gupta, Journal of the Air Pollution Control Association, December 1985) and in the prior art, such as the U.S. Patents cited in this invention.

A complete water treatment and gas emission control apparatus (comprising all process units shown in FIG. 1 including said water treatment means 3) is easily mobilized and demobilized because of its modular construction and its feasibility of being skid mounted, truck mounted, train mounted, boat mounted, or combinations thereof, for enhancing mobility.

For specific gas emission control, the purifying agent in said gas purification contactor 18 is totally or partially packed with said purifying agent, such as granular activated carbon (GAC), activated alumina, ion exchange resin, polymeric adsorbent, manganese oxide, sodium carbonate, membrane media, lime, fibrous activated carbon, calcium chloride, reticulated foam, lime, calcium chloride, calcite, dolomite, fiberglass media, coalescing filter media, membrane filter media, potassium carbonate, calcium carbonate, or combinations thereof, and can be chemically regenerated or treated by base (sodium hydroxide, potassium hydroxide, calcium hydroxide, or combinations thereof), aluminate (sodium aluminate, potassium aluminate, or both), chromium compound (potassium dichromate, sodium dichromate, or both), or manganese compound (potassium permanganate, sodium permanganate, or both).

The clarifier 20 of the present invention shown in FIG. 2 is either a sedimentation clarifier or a flotation clarifier. The filter 21 of the present invention shown in FIG. 2 is a single media filter, a multi-media filter, a diatomaceous earth (DE) filter, a cartridge filter, a granular activated carbon (GAC) filter, a micro filter, an ultra filter, or combinations thereof. The disinfection unit 22 of the present invention also shown in FIG. 2 is ultraviolet (UV) using UV light, chlorination using chlorine, ozonation using ozone, or combinations thereof.

While the invention has been described and illustrated with reference to a specific embodiment thereof, it will be understood that the modification and variations thereof will occur to those skilled in the art, and that the following examples and the appended claims are intended to cover such modifications and variations which are within the scope and spirit of this invention.

For example, the flow meter 40, vacuum/pressure gauge 41, humidity meter 42, or combinations thereof, shown in FIG. 1, can be idled or disconnected.

Alternatively, a foam collector-breaker 51, shown in FIG. 1, can be added to the gas emission control system of this invention for collecting and breaking surface active foam present in said emitted gas stream 14. Said foam collector-breaker 51 is to be connected directly or indirectly to said enclosure 12.

Alternatively, a scrubber means 52 can be added to the gas emission control system (FIG. 1) of this invention for removing volatile inorganic compounds (VICs) present in said emitted gas stream 14. Said scrubber means 52 is a wet scrubber, a dry scrubber, or both, directly or indirectly connected to said dehumidifying means comprising said demister pad 16. For the preferred embodiments of this invention, a wet scrubber 52 shall be installed at upstream of said demister pad 16; while a dry scrubber 52 shall be installed at downstream of said demister pad 16, as shown in FIG. 1.

Still the inert gas source 60 can be installed at either downstream or upstream of said gas mover 15, as shown in FIGS. 1 and 2. If said inert gas source 60 is located at downstream or pressure side of said gas mover 15, a venturi feeder 60V is needed for feeding inert gas into said gas piping system 13. If said inert gas source 60 is located at upstream or suction side of said gas mover 15, a venturi feeder 60V is not needed.

Still alternatively the make-up gas source 50 can be directly connected to said water treatment means 3, or connected at upstream or suction side of said gas mover 15, as shown in FIGS. 1 and 2.

The complete water treatment and gas emission control system of this invention shown in FIGS. 1 and 2 is a single stage system, and can be operated under various environmental or process conditions. Specifically the water phase 53 inside said water treatment means 3 shown in FIG. 2, can have, at least, the following eight process conditions for a single stage water treatment system:

(a) Condition A: aerobic condition, without chemical 31, without microorganisms 30;

(b) Condition B: aerobic condition, with chemical 31, without microorganisms 30;

(c) Condition C: aerobic condition, without chemical 31, with microorganisms 30;

(d) Condition D: aerobic condition, with chemical 31, with microorganisms 30;

(e) Condition E anaerobic condition, without chemical 31, without microorganisms 30;

(f) Condition F: anaerobic condition, with chemical 31, without microorganisms 30;

(g) Condition G: anaerobic condition, without chemical 31, with microorganisms 30; and (h) Condition H: anaerobic condition, with chemical 31, with microorganisms 30.

Figure 3:
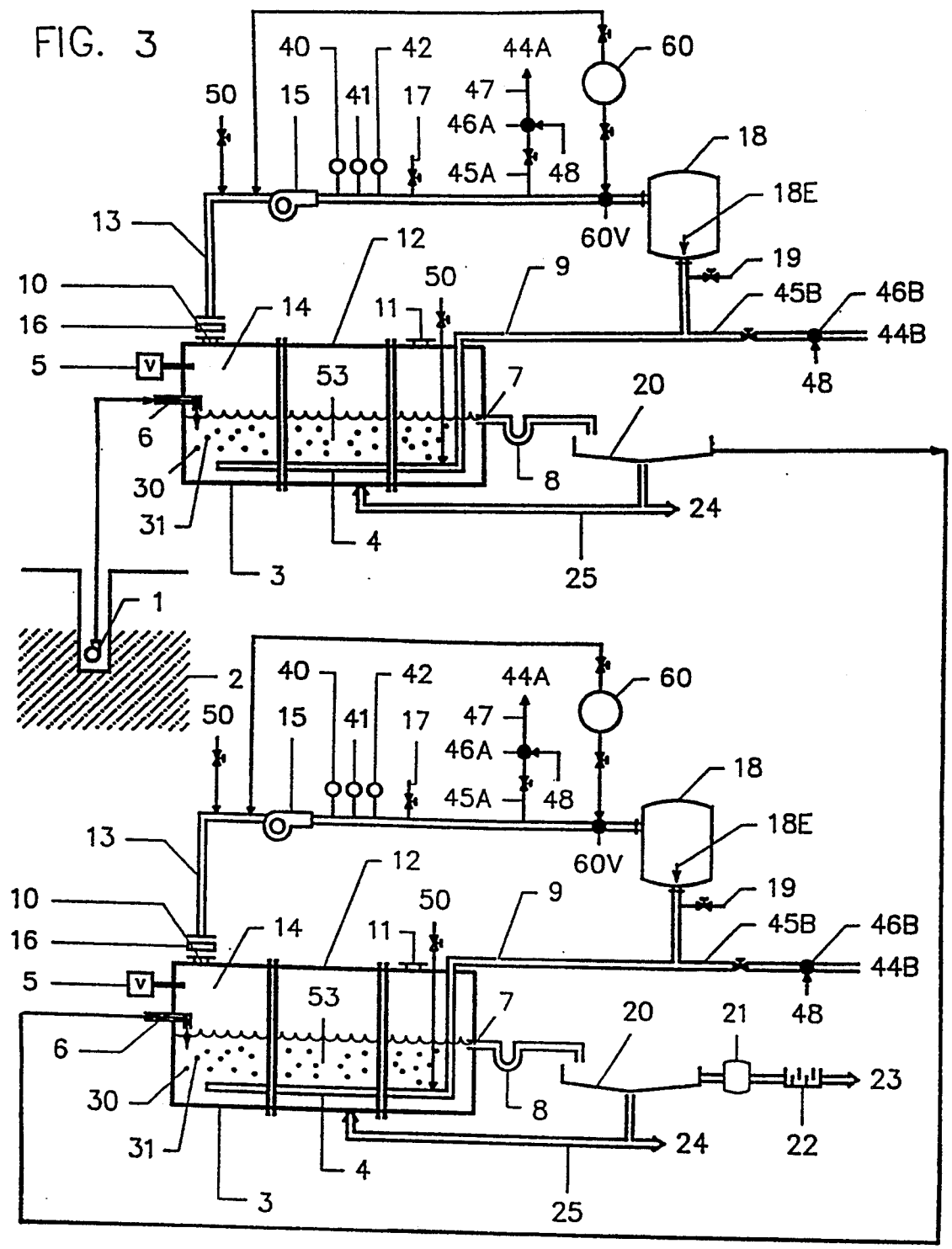
FIG. 3 is a schematic diagram of the present invention when a two stage system is applied to water treatment or wastewater treatment considering gas emission control.

A multiple stage water treatment system having multiple sets of process units shown in FIGS. 1 and 2 (except said filter 21 and said disinfection unit 22) is also covered by this invention. Various combinations of the above eight process conditions (Conditions A to H) are available for said multiple stage water treatment. FIG. 3 shows a two stage water treatment system of this invention having two sets of process units (i.e. The process units shown in FIGS. 1 and 2 are duplicated) except said filter 21 and said disinfection unit 22. The water phase 53 inside said two water treatment meanses 3 shown in FIG. 3 for a two-stage system can have many operating environmental and process conditions, namely various combinations of the eight Conditions A, B, C, D, E, F, G, and H identified in the last paragraph. For example, the combination of Conditions C and G for the first and the second, respectively, of the water treatment means 3 shown in FIG. 3 is an efficient aerobic/anoxic two-stage biological treatment system suitable for treating water contaminated by industrial pollutants.

The combination of Conditions B and C (or D) identified above is an efficient two-stage physicochemical & biological treatment system, which is also represented by FIG. 3.

The complete water treatment and gas emission control system of this invention can be expanded to more than two stages.

A three-stage system of this invention (not shown), for instance, has been proven to be an efficient biological treatment system for carbonaceous oxidation in the first stage (Condition C or D), nitrification in the second stage (Condition C or D), and denitrification in the third stage (Condition G or H). The theory, principles, and chemical reactions of carbonaceous oxidation, nitrification, and denitrification are reported in the literature by Lawrence K. Wang et al (Journal of Environmental Science, Volume 21, pages 23–28, December 1978).

The gas emission control system of this invention (all process units shown in FIG. 1 except said water treatment means 3) is always needed in the first stage, but may or may not be needed in the later stages.

The sparger system 4 (FIGS. 2 and 3) of this invention is a porous tube diffusion means, a porous plate diffusion means, nozzle diffusion means, an induced gas diffusion means, a diaphragm diffusion means, a jet gas diffusion means, a mechanical diffusion means, or combinations thereof.

Common reactive purifying agent packed inside said gas purification contactor 18 (FIGS. 1, 2, and 3) includes, at least, virgin granular activated carbon, virgin fibrous activated carbon, virgin polymeric adsorbent, base treated granular activated carbon, base treated fibrous activated carbon, base treated polymeric adsorbent, aluminate treated granular activated carbon, aluminate treated fibrous activated carbon, aluminate treated polymeric adsorbent, or combinations thereof. All base treated said purifying agent are impregnated with base; while all aluminate treated said purifying agent are impregnated with aluminate. Said base includes sodium hydroxide, potassium hydroxide, calcium hydroxide, or combinations thereof. Said aluminate includes sodium aluminate, potassium aluminate, or both. Both base treated purifying agent and the aluminate treated purifying agent of this invention are used for removing odorous contaminants from an emitted gas stream 14. Special chromium impregnated granular activated carbon, chromium impregnated fibrous activated carbon, chromium impregnated polymeric adsorbent, manganese impregnated granular activated carbon, manganese impregnated fibrous activated carbon, manganese impregnated polymeric adsorbent or combinations thereof, can be used as the purifying agent in the gas purification contactor 18 of this invention for removing formaldehyde gas and hydrocarbon gases from said emitted gas stream 14.

Said chromium comprises potassium dichromate, sodium dichromate, or both. Said manganese comprises potassium permanganate, sodium permanganate, or both.

The water treatment step of said water treatment means 3 comprises a continuous process steps described previously, and shown in FIG. 2, and a batch process steps described in the following paragraph.

The batch process steps for operating the water treatment means 3 of this invention comprise the following steps in sequence:

(a) pumping and discharging the contaminated water 2 into a water treatment means 3 until said water treatment means 3 reaches its full capacity, which is termed a Filling Phase; said Filling Phase further comprising a Static Filling Phase, a Mixed Filling Phase, a Reacting Filling Phase, or combinations thereof, depending on simultaneously feeding or subsequently feeding gas bubbles, microorganisms 30 and/or chemical 31 into said water treatment means 3; Said Static Filling Phase further representing a specific operating time period during which gas bubbles, microorganisms 30 and/or chemical 31 are not simultaneously fed to said water treatment means 3 together with said contaminated water 2; Said Mixed Filling Phase further representing a specific operating time period during which microorganisms 30 and/or chemical 31 are simultaneously fed to said water treatment means together with said contaminated water under a mixing condition; Said Reacting Filling Phase further representing a specific operating time period during which gas bubbles, microorganisms 30 and/or chemical 31 are fed into said water treatment means 3 together with said contaminated water 2 under another mixing condition, (b) stopping to feed microorganisms 30 and/or chemical 31 but still feeding gas bubbles into said water treatment means 3 for removing contaminants from said contaminated water 2 and producing a water effluent and an emitted gas stream 14; simultaneously collecting, transporting, dehumidifying, monitoring, and purifying the emitted gas stream 14 and producing a gaseous contactor effluent 18E; recycling said contactor effluent 18E to said water treatment means 3 for continuously generating gas bubbles for reuse; Step b being a Reacting Phase, (c) stopping to feed gas bubbles to said water treatment means 3 allowing insoluble sludge in the water effluent to separate by density difference without turbulence, thereby producing a clarified effluent and a separated sludge; said density difference being either sedimentation clarification or flotation clarification; Step c being a Separating Phase, (d) discharging the clarified effluent from said water treatment means 3; filtering, disinfecting, discharging, or combinations thereof, said clarified effluent; Step d being Effluent Discharging Phase, (e) totally or partially discharging the separated sludge from said water treatment means 3; Step e being Sludge Wasting Phase, (f) allowing said water treatment means 3 to remain idle until said water treatment means 3 is to be filled again; Step f being an Idling Phase which is used when there is more than one said water treatment means 3, and the lowest idling time being zero, and (g) repeating the batch process cycle from steps a to f for a plurality of times for treating said contaminated water 2 while simultaneously collecting, transporting, monitoring, dehumidifying purifying recycling and reusing the emitted gas stream 14.

Said sedimentation clarification is a process method by which insoluble suspended solids and settleable solids settle to the bottom of said water treatment means 3 by gravity because the densities of said insoluble suspended solids and said settleable solids are higher than that of water. Said flotation clarification is a process method by which said insoluble suspended solids and said settleable solids float to a water surface inside said water treatment means 3 by rising gas bubbles with diameter smaller than 80 microns because the combined density of said fine gas bubbles, said insoluble suspended solids and said settleable solids are lower than that of water. Fine gas bubbles are produced by a gas dissolving and bubble generating means described by the U. S. Pat. Nos. 5,049,320 (Sep. 17, 1991) and 5,167,806 (Dec. 1, 1992) of Lawrence K. Wang et al, or commercially available means for producing fine gas bubbles.

What we claim is:

1. A gas emission control process for treating an emitted gas stream from a water treatment step comprising the following steps:
    (a) collecting said emitted gas stream from said water treatment step,
    (b) transporting said emitted gas stream from said water treatment step, and removing humidity from said emitted gas stream, thereby producing a dehumidified emitted gas stream,
    (c) monitoring said dehumidified emitted gas stream for a condition selected from the group consisting of gas flow, vacuum, pressure, humidity, or combinations thereof,
    (d) sampling and determining the gas quality of said dehumidified emitted gas stream,
    (e) bypassing and diluting a portion of said dehumidified emitted gas stream with air; producing an air-diluted emitted gas stream; and discharging said air-diluted emitted gas stream,
    (f) diluting the remaining non-bypassed portion of said dehumidified emitted gas stream with at least one inert gas, thereby producing an inert gas diluted gas stream,
    (g) purifying said inert gas diluted gas stream with a purifying agent, thereby producing a contactor effluent,
    (h) sampling for determining the gas quality of said contactor effluent, and the efficiency of said gas emission control process in removing volatile contaminants,
    (i) periodically bypassing and diluting a portion of said contactor effluent with air, producing an air-diluted contactor effluent, and discharging said air-diluted contactor effluent to an ambient air environment,
    (j) recycling the remaining non-bypassed portion of said contactor effluent to said water treatment step for further treating said contaminated water, and generating additional emitted gas stream, and
    (k) providing a make-up gas to said water treatment step for further treating said contaminated water.

2. The process of claim 1 wherein said purifying agent is selected from the group consisting of granular activated carbon, fibrous activated carbon, base treated granular activated carbon, base treated fibrous activated carbon, aluminate treated granular activated carbon, aluminate treated fibrous activated carbon, polymeric adsorbent, base treated polymeric adsorbent, aluminate treated polymeric adsorbent, activated alumina, ion exchange resin, manganese oxide, magnesium oxide, calcite, dolomite, lime, calcium chloride, reticulated foam, fiberglass media, coalescing filter media, membrane filter media, chromium impregnated granular activated carbon, chromium impregnated fibrous activated carbon, chromium impregnated polymeric adsorbent, manganese impregnated granular activated carbon, manganese impregnated fibrous activated carbon, manganese impregnated polymeric adsorbent, sodium carbonate, potassium carbonate, or combinations thereof.

3. The process of claim 1 wherein said inert gas is produced from a gas producing system selected from the group consisting of a pressure swing adsorption system, a vacuum swing adsorption system, a liquid gas cylinder or combinations thereof, and comprises nitrogen, helium carbon dioxide, or combination thereof.

4. The process of claim 1 wherein said water treatment step is selected from the group consisting of gas stripping, gas sparging, dissolved gas flotation, dispersed gas flotation, foam separation, froth flotation, non-biological treatment, physical-chemical treatment, aerobic biological treatment, anaerobic biological treatment, or combinations thereof.

5. The gas emission control process of claim 1 wherein said water treatment step treats a contaminated water by the following continuous process steps:
    (a) pumping and discharging the contaminated water into a water treatment means,
    (b) adjusting the hydraulic residence time of said water treatment means to conform to different flow rates of incoming said contaminated water and providing sufficient gas head space above a water level inside said water treatment means,
    (c) feeding a gas, microorganisms, a chemical, or combinations thereof into said water treatment means for removing contaminants from said contaminated water inside said water treatment means,
    (d) bubbling gas bubbles through a water phase comprising the contaminated water inside said water treatment means,
    (e) physically stripping residual volatile contaminants from the water phase into a gas phase inside said water treatment means by said gas bubbles,
    (f) collecting, transporting, dehumidifying, bypassing, diluting, purifying, recycling and reusing the emitted gas stream from said water treatment means,
    (g) repeating step (d) for a plurality of times,
    (h) treating the water phase inside said water treatment means for a specific residence time using said gas bubbles, chemical, microorganisms, or combinations thereof, thereby producing a water effluent,
    (i) clarifying the water effluent of said water treatment means for separating insoluble suspended sludges from the water effluent, and producing a clarified effluent and a separated sludge stream; recycling a portion of the separated sludge stream to said water treatment means upon demand, and discharging the remaining separated sludge stream, and
    (j) filtering, disinfecting, or both filtering and disinfecting the clarified effluent before the clarified effluent is discharged.

6. The process of claim 5 wherein said chemical is selected from the group consisting of inorganic chemical, organic chemical, powdered activated carbon, peat moss, enzymes, or combinations thereof.

7. The process of claim 5 wherein said microorganisms are selected from the group consisting of aerobic microorganism, facultative microorganisms, anaerobic microorganism, and enzyme-producing enzymatic microorganisms, or combinations thereof.

8. The gas emission control process of claim 1 wherein said water treatment step treats a contaminated water by the following batch process steps in sequence:
   (a) a Filling Phase which comprises pumping and discharging the contaminated water into a water treatment means until said water treatment means reaches its full capacity; feeding gas bubbles, microorganisms, a chemical, or combinations thereof into said water treatment means;
   (b) a Reacting Phase which comprises stopping to feed the microorganisms, the chemical, or both but feeding gas bubbles into said water treatment means for removing contaminants from said contaminated water and producing a water effluent and an emitted gas stream; simultaneously collecting, transporting, dehumidifying, monitoring, and purifying the emitted gas stream and producing a gaseous contactor effluent; recycling said contactor effluent to said water treatment means for continuously generating gas bubbles for reuse;
   (c) a Separating Phase which comprises stopping to feed the gas bubbles to said water treatment means, separating the insoluble microorganisms, chemical, contaminants, or combinations thereof from the water effluent by density difference without turbulence, thereby producing a clarified effluent and a separated sludge; said density difference being either sedimentation clarification or flotation clarification;
   (d) an Effluent Discharging Phase which comprises discharging the clarified effluent from said water treatment means; filtering, disinfecting, or both filtering and disinfecting said clarified effluent before the clarified effluent is discharged;
   (e) a Sludge Wasting Phase which comprises totally or partially discharging the separated sludge from said water treatment means;
   (f) an Idling Phase which comprises allowing said water treatment means to remain idle until said water treatment means is to be filled again; and
   (g) repeating the batch process cycle from steps (a) to (f) for a plurality of times for treating said contaminated water while simultaneously collecting, transporting, monitoring, dehumidifying purifying recycling and reusing the emitted gas stream.

9. A method for operating a complete water treatment and gas emission control system comprising the following continuous process steps:
   (a) pumping and discharging a contaminated water into a water treatment means,
   (b) adjusting the hydraulic residence time of said water treatment means to conform to different flow rates of incoming said contaminated water and providing sufficient gas head space above a water level inside said water treatment means,
   (c) feeding a gas, microorganisms, a chemical, or combinations thereof, into said water treatment means for removing contaminants from said contaminated water inside said water treatment means,
   (d) bubbling gas bubbles through a water phase comprising the contaminated water inside said water treatment means,
   (e) physically stripping residual volatile contaminants from the water phase into a gas phase inside said water treatment means by said gas bubbles,
   (f) collecting, transporting, dehumidifying, bypassing, purifying, recycling, and reusing an emitted gas stream from said water treatment means using the following steps of a gas emission control process:
      collecting said emitted gas stream from said water treatment means,
      moving said emitted gas stream from said water treatment means, and removing humidity from said emitted gas stream, thereby producing a dehumidified emitted gas stream,
      monitoring said dehumidified emitted gas stream for a condition selected from the group consisting of gas flow, vacuum, pressure, humidity, or combinations thereof,
      sampling and determining the gas quality of said dehumidified emitted gas stream,
      bypassing and diluting a portion of said dehumidified emitted gas stream with air; producing an air-diluted emitted gas stream; and discharging said air-diluted emitted gas stream,
      diluting the remaining non-bypassed portion of said dehumidified emitted gas stream with at least one inert gas, thereby producing an inert gas diluted gas stream,
   purifying said inert gas diluted gas stream with a purifying agent, thereby producing a contactor effluent; sampling for determining the gas quality of said contactor effluent, and the efficiency of said gas emission control process in removing volatile contaminants,
      bypassing and diluting a portion of said contactor effluent with air, producing an air-diluted contactor effluent, and discharging said air-diluted contactor effluent to an ambient air environment,
      recycling the remaining non-bypassed portion of said contactor effluent to said water treatment means for further treating said contaminated water, and generating additional emitted gas stream, and
      providing a make-up gas to said water treatment means for further treating said contaminated water,
   (g) repeating step (d) for a plurality of times,
   (h) treating the water phase inside said water treatment means for a specific residence time using said gas bubbles, chemical, microorganisms, or combinations thereof, thereby producing a water effluent,
   (i) clarifying the water effluent of said water treatment means for separating the insoluble microorganisms, chemical, contaminants, or combinations thereof from the water effluent, thereby producing a clarified effluent and a separated sludge stream; recycling a portion of the separated sludge stream to said water treatment means upon demand, and discharging the remaining separated sludge stream, and
   (j) filtering, disinfecting, or both filtering and disinfecting the clarified effluent before the clarified effluent is discharged.

10. The method of claim 9 wherein said water treatment means is operated under one of alternate individual embodiments selected from the group consisting of:

(a) aerobic, without chemical, without microorganisms;
(b) aerobic, with chemical, without microorganisms;
(c) aerobic, without chemical, with microorganisms;
(d) aerobic, with chemical, with microorganisms;
(e) anaerobic, without chemical, without microorganisms;
(f) anaerobic, with chemical, without microorganisms;
(g) anaerobic, without chemical, with microorganisms; and
(h) anaerobic, with chemical, with microorganisms.

11. The method of claim 9 wherein said water treatment means is a two stage aerobic/anoxic biological treatment system being operated under the following process conditions simultaneously:
(a) aerobic, with or without chemical, but with microorganisms for operating the first stage of said two stage aerobic/anoxic biological treatment system for aerobic biological treatment, and
(b) anaerobic, without chemical, but with microorganisms for operating the second stage of said two stage aerobic/anoxic biological treatment system, for anoxic biological treatment.

12. The method of claim 9 wherein said water treatment means is a two stage physicochemical and biological treatment system being operated under the following process conditions simultaneously:
(a) aerobic, with chemical, but without microorganisms for operating the first stage of said two stage physicochemical and biological treatment system for physicochemical treatment, and
(b) aerobic, with or without chemical, but with microorganisms for operating the second stage of said two stage physicochemical and biological treatment system for biological treatment.

13. The method of claim 9 wherein said water treatment means is a three stage carbonaceous oxidation, nitrification and denitrification system being operated under the following conditions simultaneously:
(a) aerobic, with or without chemical, but with microorganisms in the first stage of said three stage carbonaceous oxidation, nitrification and denitrification system for carbonaceous oxidation reactions,
(b) aerobic, with or without chemical, but with microorganisms in the second stage of said three stage carbonaceous oxidation, nitrification and denitrification system for nitrification reactions, and
(c) anaerobic, with or without chemical, but with microorganisms in the third stage of said three stage carbonaceous oxidation, nitrification and denitrification system for denitrification reactions.

* * * * *